US010625992B2

(12) United States Patent
Italiano (10) Patent No.: US 10,625,992 B2
(45) Date of Patent: Apr. 21, 2020

(54) BEARING

(71) Applicant: REID LIFTING LIMITED, Chepstow, Monmouthshire (GB)

(72) Inventor: Peter Italiano, Chepstow (GB)

(73) Assignee: REID LIFTING LIMITED, Chepstow (GB)

( * ) Notice: Subject to any disclaimer, the term of this patent is extended or adjusted under 35 U.S.C. 154(b) by 0 days.

(21) Appl. No.: 16/371,477

(22) Filed: Apr. 1, 2019

(65) Prior Publication Data

US 2019/0225462 A1    Jul. 25, 2019

Related U.S. Application Data

(62) Division of application No. 14/883,740, filed on Oct. 15, 2015, now Pat. No. 10,287,138.

(30) Foreign Application Priority Data

Oct. 28, 2014  (GB) .................................. 1419157.1

(51) Int. Cl.
*B66C 23/16* (2006.01)
*B66C 23/06* (2006.01)
(Continued)

(52) U.S. Cl.
CPC ............ *B66C 23/166* (2013.01); *B66C 23/06* (2013.01); *B66C 23/701* (2013.01); *F16C 17/10* (2013.01)

(58) Field of Classification Search
CPC ..... B66C 23/02; B66C 23/022; B66C 23/025; B66C 23/16; B66C 23/36; B66C 23/44; B66C 23/485
See application file for complete search history.

(56) References Cited

U.S. PATENT DOCUMENTS 3,679,244 A  *  7/1972  Reddy ...................... F16B 2/24
                                                     403/109.3
3,978,989 A       9/1976  Avila, Jr.
(Continued)

FOREIGN PATENT DOCUMENTS

GB    2 160 170 A    12/1985
GB    2 173 473 A    10/1986
(Continued)

OTHER PUBLICATIONS

EP Examination Report in Application No. 15 189 592.7 dated Apr. 11, 2017.
(Continued)

*Primary Examiner* — Emmanuel M Marcelo
(74) *Attorney, Agent, or Firm* — Maschoff Brennan (57) ABSTRACT

The invention provides a bearing. In particular, the invention provides a bearing for allowing a column of a davit to be rotatably mounted on a substantially upright shaft. The bearing has a body shaped to correspond to an internal profile of the column. The body has a first bore for receiving a component on which the bearing bears and a first pair of parallel, spaced second bores, narrower than the first bore, which extend across the first bore in a direction perpendicular to an axis of the first bore and are configured to receive retaining pins which engage with a groove in the component received in the first bore. A single bearing can be used to rotatably couple the davit to the shaft, or king post, with a plurality of different-spaced bores to account for different diameters of shaft. This improvement allows the davit to be manufactured easily and erected easily by users.

6 Claims, 9 Drawing Sheets

(51) Int. Cl.
  *B66C 23/70* (2006.01)
  *F16C 17/10* (2006.01)

(56) References Cited

U.S. PATENT DOCUMENTS

| | | | |
|---|---|---|---|
| 4,090,625 A | | 5/1978 | Walters |
| 4,508,233 A | | 4/1985 | Helms |
| 5,205,700 A | | 4/1993 | Lin et al. |
| 5,238,310 A | * | 8/1993 | Layfield ............... F16C 23/045 384/145 |
| 5,431,526 A | | 7/1995 | Peterson et al. |
| 5,445,487 A | | 8/1995 | Koscinski, Jr. |
| 5,509,638 A | | 4/1996 | Leon-Vieito |
| 5,584,689 A | * | 12/1996 | Loge ...................... A61C 1/141 433/127 |
| 5,853,282 A | | 12/1998 | Bechler et al. |
| 6,007,289 A | * | 12/1999 | Kruse ................. A61G 3/0209 414/462 |
| 6,155,771 A | * | 12/2000 | Montz ................... B60P 1/5433 212/180 |
| 6,170,802 B1 | | 1/2001 | Stovall |
| 6,226,955 B1 | | 5/2001 | Lorrigan |
| 6,250,483 B1 | * | 6/2001 | Frommer ................. A22B 5/06 212/180 |
| 6,481,587 B2 | | 11/2002 | Higgins |
| 6,586,084 B1 | | 7/2003 | Paschke et al. |
| 6,821,075 B2 | | 11/2004 | van der Horn |
| 6,981,834 B1 | | 1/2006 | Henry |
| 7,156,246 B2 | | 1/2007 | Sherrod |
| 7,699,292 B2 | | 4/2010 | Barnett |
| 9,630,816 B1 | | 4/2017 | Napieralski et al. |
| 2005/0161422 A1 | | 7/2005 | Boily |
| 2006/0124570 A1 | | 6/2006 | Slobogean et al. |
| 2006/0163186 A1 | * | 7/2006 | Choate ................. B66C 23/166 212/175 |
| 2007/0227995 A1 | | 10/2007 | Casebolt et al. |
| 2008/0175095 A1 | * | 7/2008 | Mott ..................... B01F 7/1695 366/242 |
| 2011/0132859 A1 | * | 6/2011 | Radmall .............. A61G 7/1017 212/232 |
| 2011/0266240 A1 | * | 11/2011 | Jones ..................... B66C 23/16 212/179 |
| 2012/0199543 A1 | | 8/2012 | Bell et al. |
| 2013/0037768 A1 | | 2/2013 | Hayes |
| 2013/0075353 A1 | | 3/2013 | Thompson |
| 2013/0270354 A1 | | 10/2013 | DuBose, Jr. et al. |
| 2014/0144861 A1 | | 5/2014 | Davis |
| 2015/0351377 A1 | | 12/2015 | Dubose et al. |

FOREIGN PATENT DOCUMENTS

| | | |
|---|---|---|
| GB | 2 408 038 A | 5/2005 |
| RU | 2168456 C1 | 6/2001 |
| WO | 93/12029 A1 | 6/1993 |

OTHER PUBLICATIONS

EP Partial Search Report in Application No. 15189592.7 dated Mar. 30, 2016.

EP Search Report in Application No. 18191979.6 dated Dec. 3, 2018.

EP Examination Report in Application No. GB1419157.1 dated Jun. 29, 2018.

EP Partial Search Report in Application No. GB1419157.1 dated Jan. 19, 2018.

EP Search Report in Application No. GB1419157.1 dated Feb. 8, 2016.

GB Search Report in Application No. GB1419157.1 dated Apr. 23, 2015.

European Search Report, dated Jan. 6, 2016, in corresponding Application No. 15189592.7-1705/3023380; International filing date Oct. 13, 2015; First Named Inventor: Peter Italiano.

EP Office Action dated Apr. 11, 2017 as received in Application No. 15189592.7.

\* cited by examiner

BEARING

TECHNICAL FIELD

The present invention relates to a bearing.

BACKGROUND

Davits are known lifting devices in which lifting tackle is suspended from a pivoted boom or jib. The boom or jib can rotate around a vertical or substantially vertical axis, to allow the lifted object to be placed wherever appropriate. Davits have been used for many years in the shipping industry—usually as one of a pair—to lift lifeboats, anchors and other cargo to and from ships. However, they also find many applications on land.

As with any lifting device, it is important to ensure that the davit is safe to operate. In particular, lifting devices will only be certified for lifting objects up to a certain weight. If the device is nonetheless used to lift a heavier object, damage may be incurred—potentially invisible to the naked eye—which renders the device unsafe to use in future, even with lighter objects.

Recent davits have been made portable to increase their ease of use still further. Such davits should be straightforward to erect for use, and to collapse for transportation, without compromising the safety of the device.

SUMMARY OF INVENTION

According to a first aspect of the invention, there is provided a bearing for allowing a column of a davit to be rotatably mounted on a substantially upright shaft, the bearing having a body shaped to correspond to an internal profile of the column, the body having a first bore for receiving a component on which the bearing bears and a first pair of parallel, spaced second bores, narrower than the first bore, which extend across the first bore in a direction perpendicular to an axis of the first bore and are configured to receive retaining pins which engage with a groove in the component received in the first bore.

The component may be the shaft or a sleeve mounted on the shaft.

The body may have an outer profile that corresponds to a box section.

The first pair of second bores may each intersect with the first bore but may be each offset from a centre of the first bore.

The bearing may further comprise a second pair of parallel, spaced second bores which extend across the first bore in a direction perpendicular to an axis of the first bore.

The second pair of second bores may be parallel to the first pair of second bores.

The first pair of second bores may be spaced a first distance apart, and the second pair of bores may be spaced a second, different distance apart.

According to another aspect of the invention, there is provided a davit comprising a bearing as described above.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
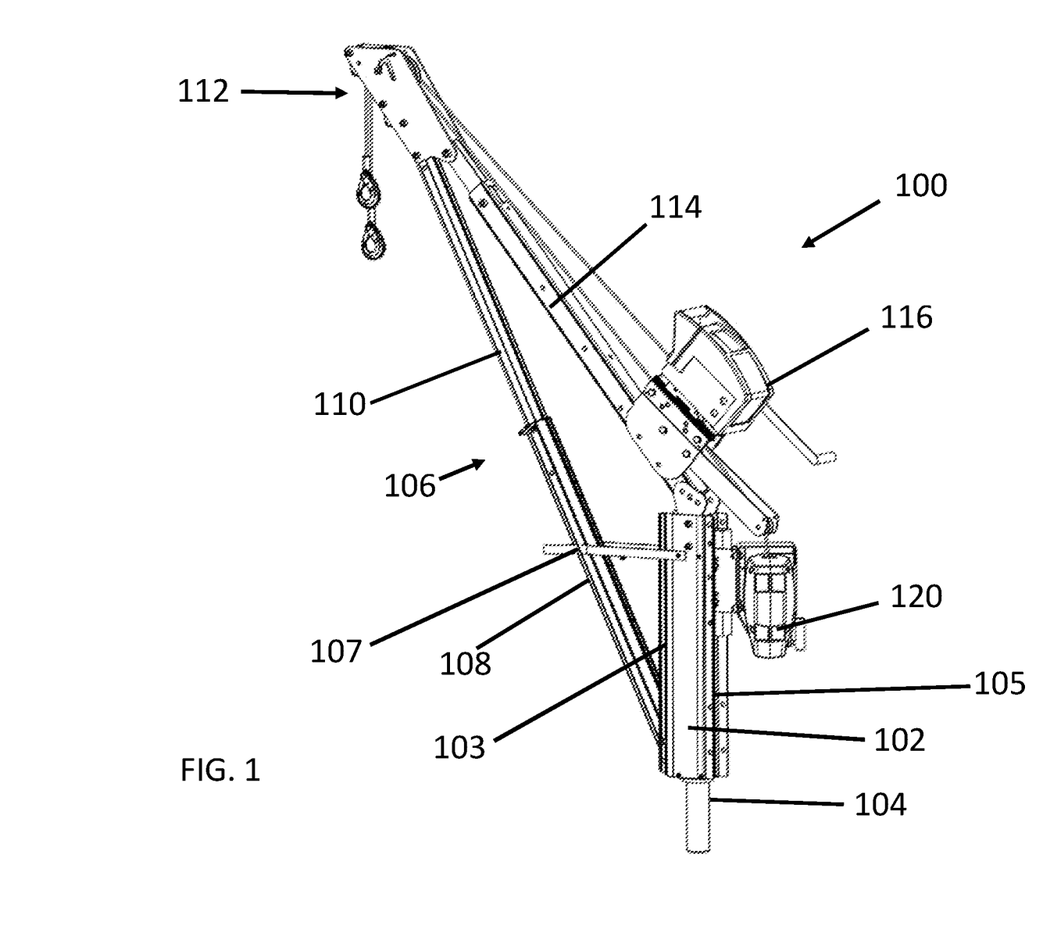
FIG. 1 shows a davit.

Referring first to FIG. 1, a davit is shown generally at 100 and comprises a column 102, which is rotatably mounted on a shaft 104 (also known as a king post or king pin). In use, the shaft 104 is fixed vertically or substantially vertically in a socket such that the column 102 rotates about a vertical or substantially vertical axis. The davit further comprises a jib 106, which is pivotally coupled to the column 102 at a lower portion thereof, and a backstay 114, which is pivotally coupled to the column 102 at an upper portion thereof. Towards their furthest ends from the column 102, the jib 106 and the backstay 114 are coupled together via a lifting head 112.

The column 102 has a central body which corresponds to a hollow box section, and two pairs of ribs or flanges extending from either side of the body. One pair of ribs 103 is formed on one side of, and projecting from, the column 102, while another pair of ribs 105 is formed on the opposite side of the column 102. The ribs within each pair run parallel to each other and run the length of the column, strengthening the column 102 and allowing attachment to other components of the davit 100.

Figure 11:
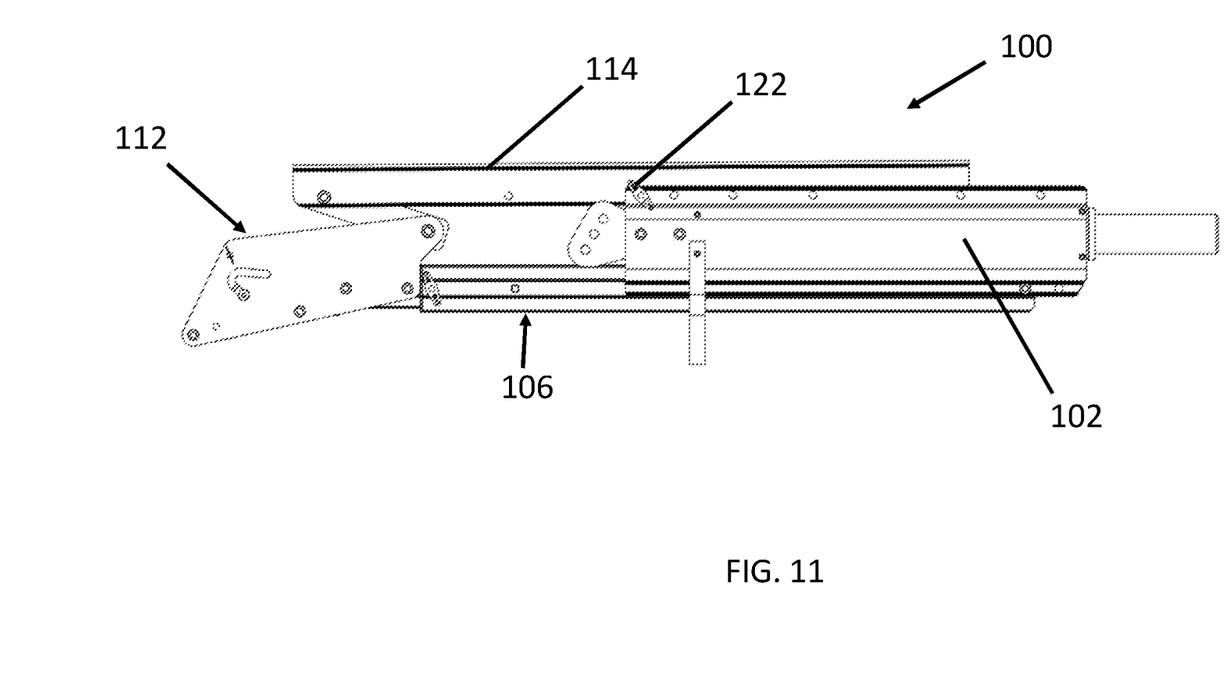
FIG. 11 shows a davit when in a folded state.

The jib 106 has a telescoping action that allows it to move between an extended position (as shown in FIG. 1) and a collapsed position (as shown in FIG. 11). In the extended position, the jib 106 supports the lifting head 112 such that the davit 100 can be used for lifting objects; in the collapsed position, the jib 106 allows the davit 100 to fold such that it has reduced dimensions for transportation. For this purpose, the jib 106 comprises an outer jib section 108 coupled to the column 102, and an inner jib section 110 coupled to the lifting head 112. The inner jib section 110 has narrower dimensions than the outer jib section 108 such that the inner jib section 110 may fit within the outer jib section 108, and the two sections are coupled together such that the inner jib section 108 can slide between a retracted position (in which the majority or all of the inner jib section 110 is within the outer jib section 108) and an extended position (in which the majority or all of the inner jib section 110 is extended from the outer jib section 108).

Those skilled in the art will appreciate that the jib 106 may comprise more than two sections and still possess the telescoping action described above; thus, the inner and outer jib sections 108, 110 may be coupled together via one or more intermediate sections having dimensions between those of the inner and outer jib sections. Further, the order of the jib sections may be reversed without departing from the scope of the invention as defined in the claims appended hereto. That is, the inner jib section 110 may be connected to the column 102 while the outer jib section 108 may be connected to the lifting head 112.

Figure 2:
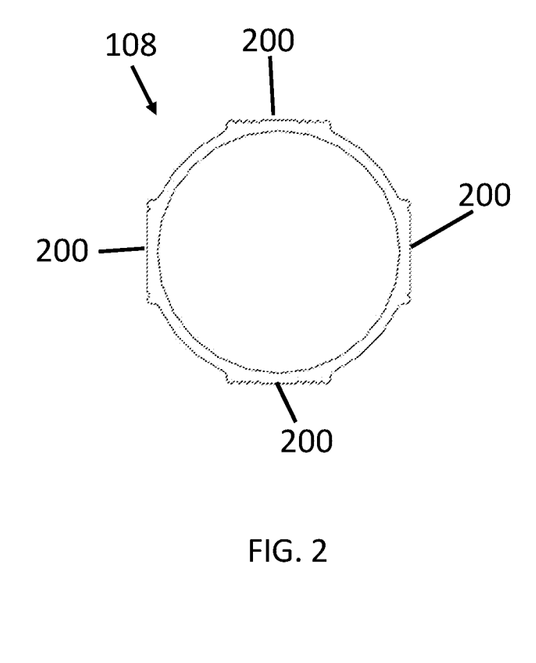
FIG. 2 shows an outer jib section.

FIG. 2 is a schematic diagram showing a cross-section through the outer jib section 108. The outer jib section 108 is a hollow tube. The inner profile of the section is generally circular; the outer profile is also generally circular, but has a plurality of flats 200 arranged around the circumference, and extending along the length of the tube. The flats 200 provide a generally flat surface on the exterior of the outer jib section 108. The flats 200 may be arranged in pairs, such that the flats within each pair are on opposing sides of the jib section 108. In the illustrated embodiment, the jib section 108 comprises four flats 200, i.e. two pairs evenly distributed around the circumference of the section 108. However, in other embodiments the outer jib section 108 may comprise more flats (e.g. eight) or fewer flats (e.g. two). The flats 200 provide added strength and improved machinability to the outer jib section 108.

Figure 3:
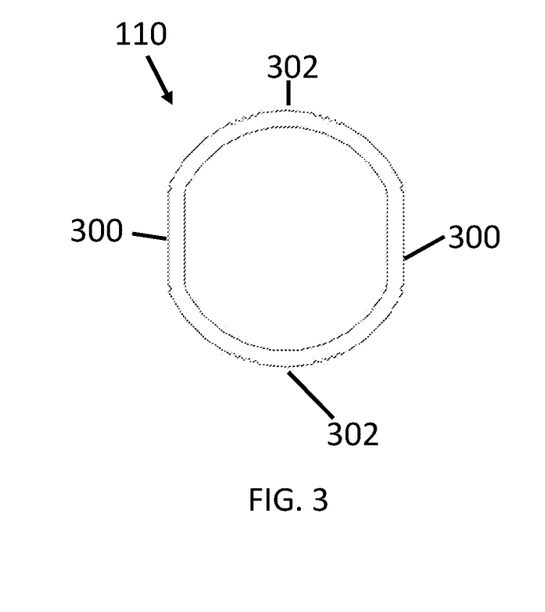
FIG. 3 shows an inner jib section.

FIG. 3 is a schematic diagram showing a cross-section through the inner jib section 110 according to some embodiments of the invention. The inner jib section is also hollow. The inner and outer profiles are similar, with both having parallel, flat sidewalls 300 connected by arcuate sections 302. The arcuate sections 302 and flat sidewalls 300 extend along the length of the inner jib section.

The parallel sidewalls 300 provide improved machinability, but also provide an easier, more secure mechanism for attaching the jib 106 to other components of the davit 100, as will be described in more detail below (see FIG. 7). The external profile of the inner jib section is sized to fit within the internal profile of the outer jib section, and the arcuate sections 302 may correspond to parts of the inner profile of the outer jib section 108, such that the inner jib section 110 slides easily and securely in the outer jib section. That is, the radii of curvature of the arcuate walls 302 may be the same as or less than the radius of curvature of the inner profile of the outer jib section 108. Alternatively or additionally, the jib may comprise a spacer that may be fitted around an open upper end of the outer jib section (not illustrated). The spacer may then define an opening having a shape that corresponds to the external profile of the inner jib section. The close fit between the inner profile of the spacer and the non-circular outer profile of the inner jib section 110, then inhibits rotation of the inner jib section 110 within the outer jib section 108.

It will also be apparent from a comparison of FIGS. 2 and 3 that, according to some embodiments, the walls of the outer jib section 108 are thinner than the walls of the inner jib section 110. This allows the jib 106 to be used as an indicator that the davit has been overloaded and may be unsafe to use in future (see FIGS. 5 and 6).

Figure 4:
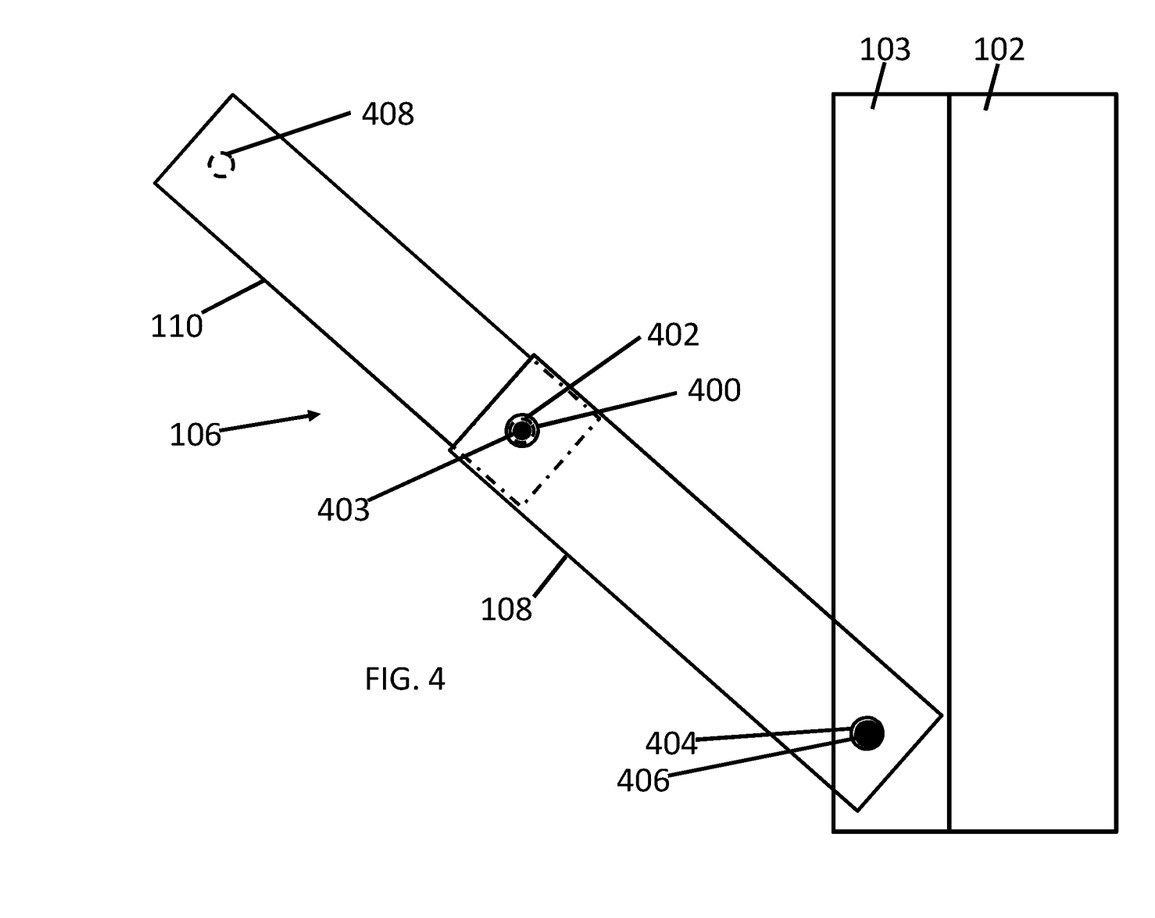
FIG. 4 is a schematic diagram showing the coupling of the jib to the column.

FIG. 4 shows the jib 106 in an extended position, in which the inner jib section 110 lies substantially outside the outer jib section 108. A lower portion of the inner jib section remains in an upper portion of the outer jib section, however, in order that the two sections can be directly coupled together.

The outer jib section 108 defines a first outer aperture 400 which is formed through a wall in an upper portion of the outer jib section 108. In embodiments, the first outer aperture may be one of a pair located on opposite sides of the outer jib section and aligned with each other. The first outer aperture(s) 400 is formed through a flat 200 of the outer jib section 108.

The inner jib section 110 similarly defines a first inner aperture 402 formed through a wall in the lower portion of the inner jib section 110. In embodiments, the first inner aperture 402 may be one of a pair located on opposite sides of the inner jib section 110 and aligned with each other. When the jib 106 is in the extended position, the first outer aperture 400 becomes aligned with the first inner aperture 402 such that a retaining pin 403 can be inserted therethrough to fix the inner and outer jib sections 110, 108 relative to each other, as shown in FIG. 4.

The outer jib section 108 also defines a pair of second outer apertures 404 which are formed through the walls of a lower portion of the outer jib section 108. Each of the ribs 103 defines a connection aperture, aligned with each other and with the pair of second outer apertures 404. A connection bolt 406 passes through both the connection apertures and the pair of second outer apertures such that the base of the outer jib section is attached pivotally to the column 102 by the connection bolt. A retaining strap 107 (see FIG. 1) can also be connected between the jib 106 and the column 102.

The inner jib section 110 defines a pair of second inner apertures 408 which are formed through the walls of an upper portion of the inner jib section. The pair of second inner apertures 408 are located on opposite sides of the inner jib section 110 and are aligned with each other such that a retaining pin inserted though both of the second inner apertures bisects the inner jib section.

Figure 5:
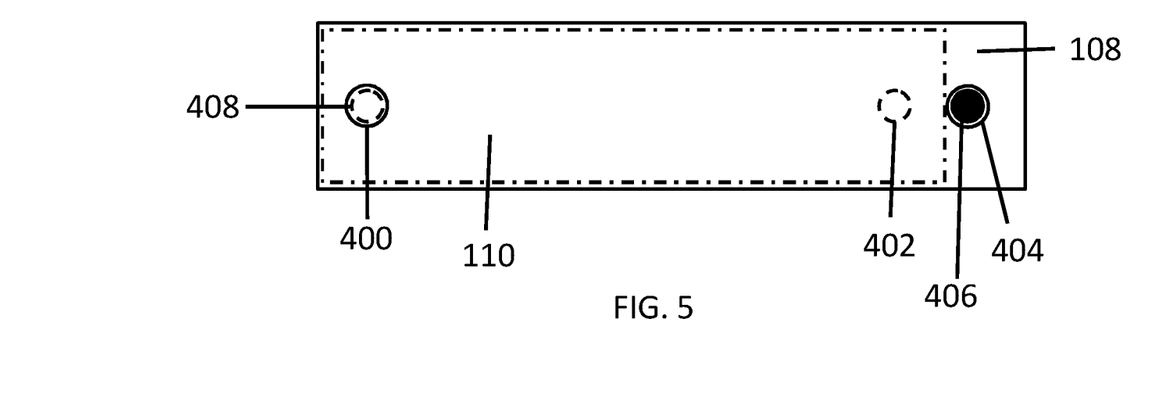
FIG. 5 is a schematic diagram showing the jib in a collapsed state.

FIG. 5 shows the jib 106 in a retracted position after normal use, i.e. when the davit has been used within its normal working parameters. In the retracted position, the inner jib section 110 rests on connection bolt 406, and the pair of second inner apertures align with the first outer aperture in the retracted position, enabling the retaining pin 403 to be inserted though the first outer aperture and second inner apertures such that the inner jib section is fixed in the retracted position.

Figure 6:
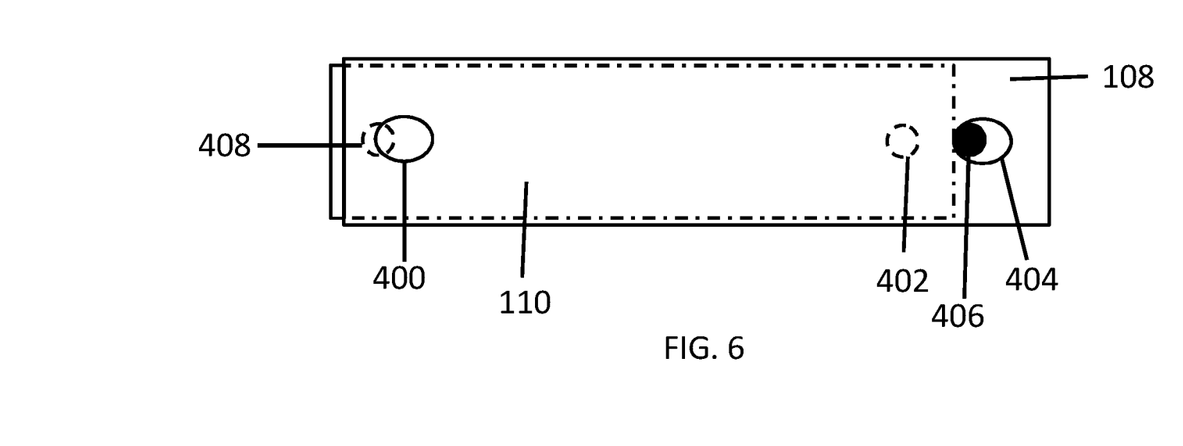
FIG. 6 is a schematic diagram showing the jib in a collapsed state following an overload condition.

FIG. 6 shows the jib 106 in a retracted position after an overload condition has occurred, i.e. after the davit 100 has been used to lift objects weighing more than a predetermined weight threshold. When lifting an object via the lifting head 112, the jib 106 is placed under compressive stress. In the event that the jib is overloaded, the outer jib section 108 is designed to yield before the inner jib section 110, since the walls of the outer jib section 108 are thinner than the walls of the inner jib section 110. The outer jib section yields 108 primarily around the first and second outer apertures 400, 404, as these are points of weakness of the outer jib section 108. In an overload condition, therefore, the first and second outer apertures 400, 404 tend to yield towards the centre of the outer jib section 108, such that the apertures become elongated in those directions. Thus, the distance between the first outer apertures 400 and the second outer apertures 404 is reduced when an overload condition occurs.

Note that the deformation shown in FIG. 6 is for illustrative purposes; in practice the apertures may not yield to such a great extent. For example, the first outer apertures 400 may yield by 1 mm and the second outer apertures 404 may yield by 1 mm, such that the distance between the first outer apertures 400 and the second outer apertures 404 is reduced by 2 mm.

When the jib is retracted after an overload condition has occurred, the first outer apertures 400 are no longer aligned with the second inner apertures 408 such that the retaining pin 403 can no longer be inserted through both the first outer apertures 400 and the second inner apertures 408. This provides an indication to a user of the davit 100 that an overload condition has occurred and the davit may no longer be safe to use.

Figure 7:
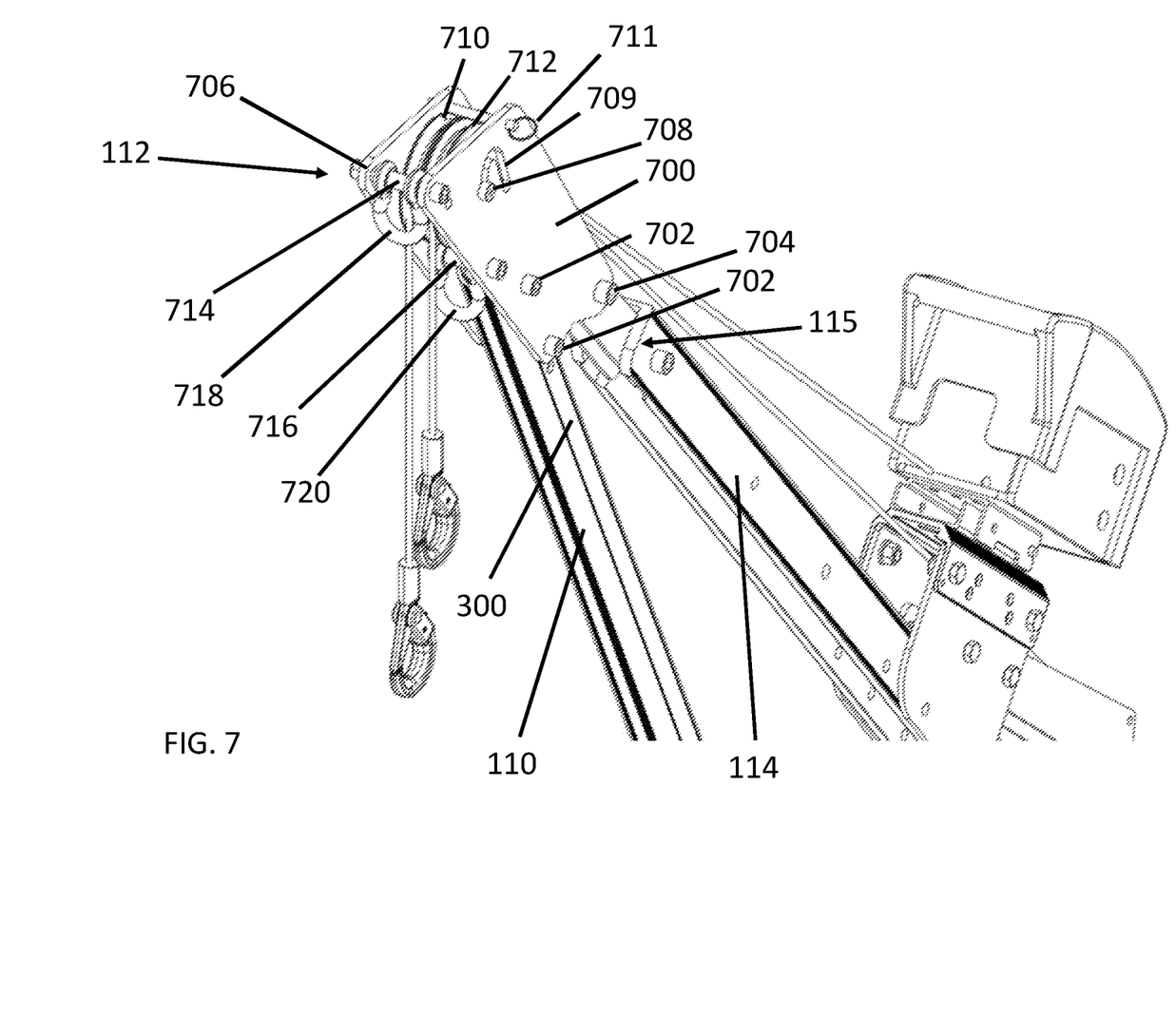
FIG. 7 shows a lifting head of the davit.

FIG. 7 is a perspective view showing in more detail the lifting head 112 of the davit 100.

As recited above, the lifting head 112 is attached at distal ends of the jib 106 and the backstay 114. In the illustrated embodiment, the backstay 114 is rigid and comprises upper and lower limbs pivotally coupled to each other by a joint 115. In this way, the backstay 114 can be folded to allow the davit 100 to move to a folded state (see FIG. 11). In the illustrated embodiment, the lower limb extends beyond the joint 115 such that it partially overlaps the upper limb, and prevents the backstay from folding inwards. Those skilled in the art will appreciate that in alternative embodiments the upper limb may extend beyond the joint 115 instead of the lower limb, achieving the same result.

The head comprises a first plate 700 attached to the first flat side wall 300 of the inner jib section 110 by pins 702. The first plate is also attached to the backstay 114 by a pin 704. The head also comprises a second plate 706 which is also attached to the opposite sidewall 300 of the inner jib section 110 by pins 702 and is attached to the backstay 114 by pin 704. Thus pins 702 and 704 pass through apertures formed in the first head plate, the inner jib section, the backstay and the second head plate, such that these four components are fixed together.

The first and second plates are further linked together by linking pin 708 on which first and second sheaves 710, 712 are mounted between the first and second plates 700, 706. The linking pin 708 is mounted in corresponding slots 709 machined in the first and second plates. The slots are curved such that the ends of the slots are lower than the parts of the slot in between. In this way, the slots define two positions for the linking pin 708 and thus the sheaves 710, 712. The linking pin 708 can be moved between the two positions to vary the lifting performance of the davit as required. A locking pin 711 is provided at a position outside the diameter of the sheaves 710, 712 but sufficiently close to the slot to enable the linking pin 708 to be locked in place, in either position defined by the slot 709, during use. Winch cables 806, 808 pass over the sheaves 710, 712, respectively to lifting hooks or other similar lifting tools. The winch cables 806, 808 are secured at their other ends to winching devices (to be described in more detail below). In other variants of the davit, however, only one sheave may be mounted between the plates or the davit may not include a sheave mounted between the plates.

The first and second plates are linked together by a first additional linking pin 714, located forwards of the inner jib section 110. A first shackle 718 is mounted on the first additional linking pin 714. The first and second plates are further linked together by a second additional linking pin 716, located forwards of the inner jib section 110. A second shackle 720 is mounted on the second additional linking pin 716.

The skilled person will appreciate that although the head 112 has been shown here with two sheaves and two shackles, other arrangements of sheaves, shackles and other lifting tools could be used.

Figure 8:
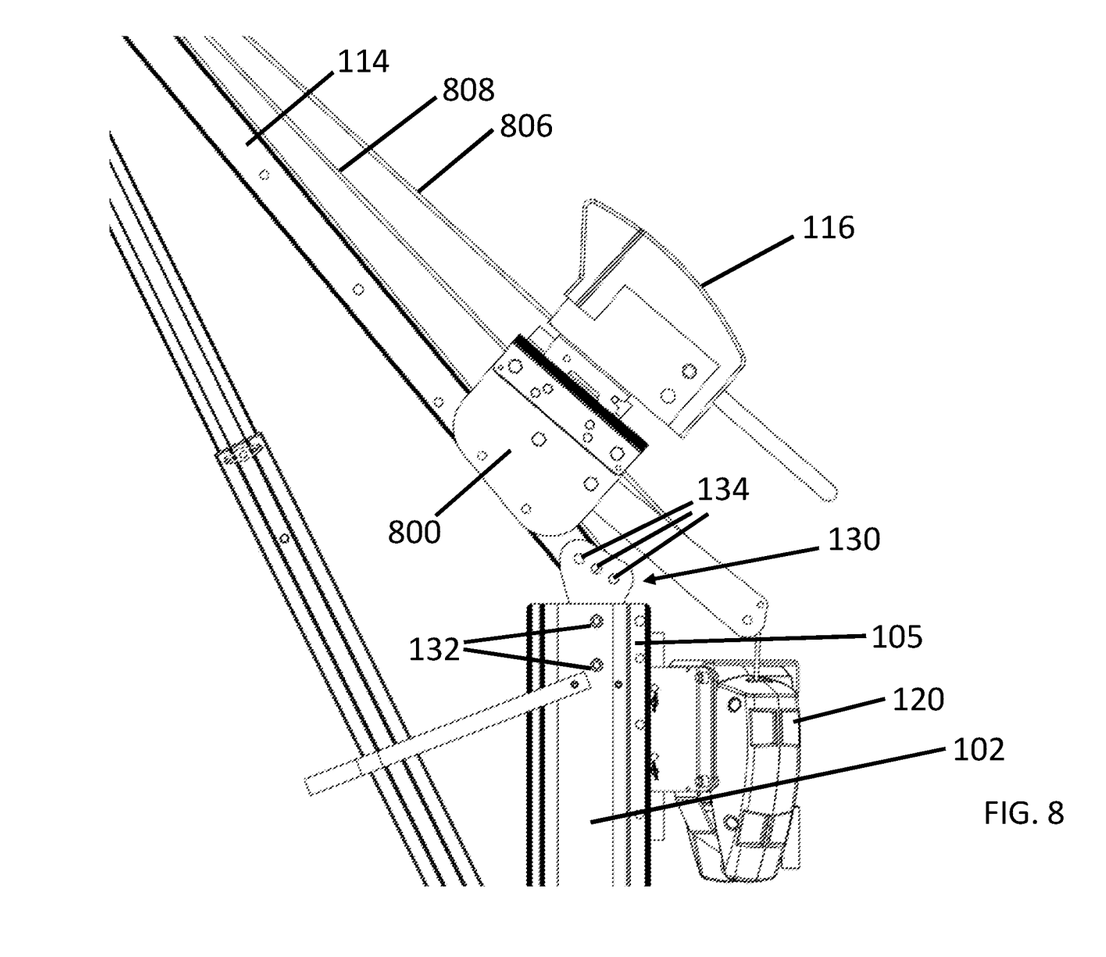
FIG. 8 shows a winching arrangement and radial adjustment mechanism of the davit according to embodiments of the invention.

FIG. 8 shows a side view of the winching arrangement of the davit. A first winching device 116 is attached to the backstay 114 via a winch support bracket 800. The winch support bracket 800 defines a hollow bore, such that the first winching device 116 is displaced from the backstay 114. In the illustrated embodiment, the first winch cable 806 passes from the first winching device 116 to one of the sheaves 710 in the lifting head 112.

A second winching device 120 is attached to the second pair of ribs 105 of the column 102. A second winch cable 808 extends from the second winching device and passes through the hollow bore defined by the winch support bracket 800 such that the second winch cable is below and spaced from the first winch cable 806. After passing through the winch support bracket 800, the second winch cable passes over the second sheave 712, as shown in FIG. 7. This arrangement enables the first and second winch cables to be operated independently of each other, without risk of fouling.

FIG. 8 also shows the connection of the backstay 114 to the column 102. A connection device 130 is rigidly coupled to the column 102 by connection pins 132. A plurality of connection points 134 are machined in the connection device, each spaced a different radial distance from the central axis of the column 102. The backstay 114 is pivotally coupled to one of these connection 134 by a connection pin. By selection of one of the connection points 134, therefore, a user of the davit 100 is able to control the radial distance of the lifting head 112 from the column as required.

Figure 9:
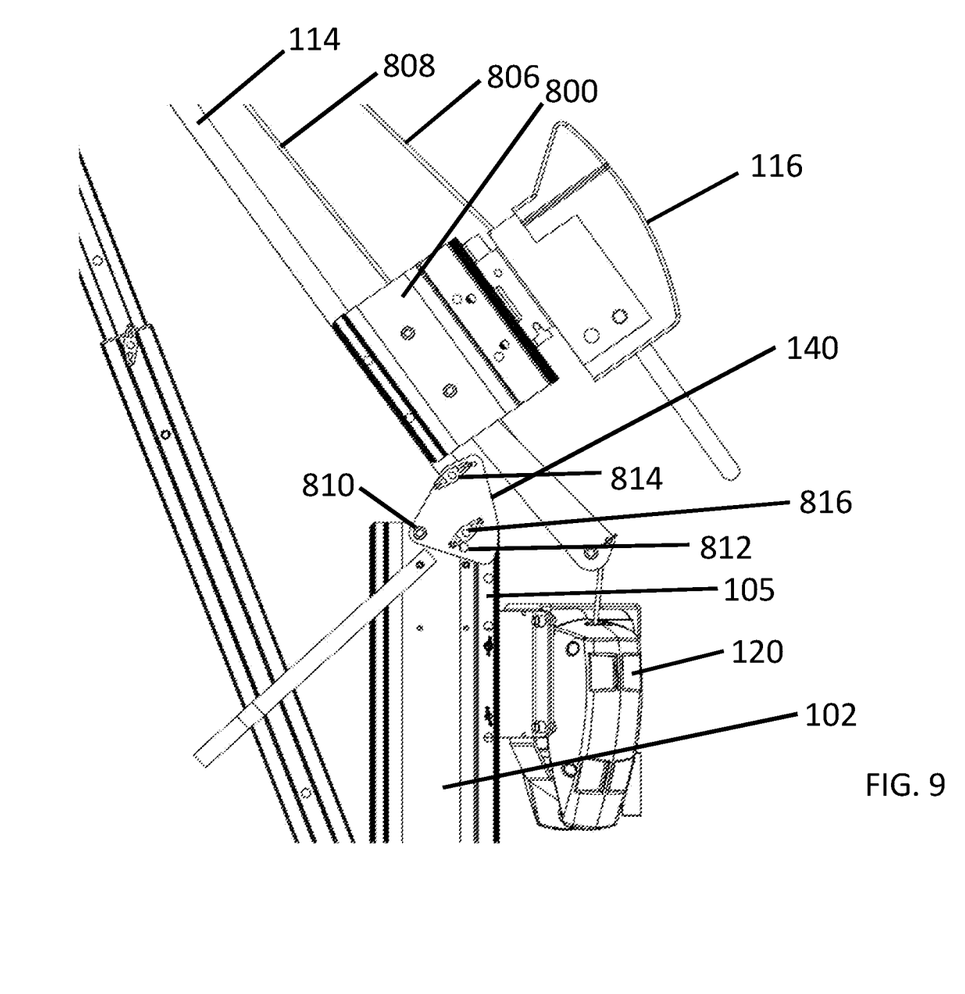
FIG. 9 shows an alternative radial adjustment mechanism.

In an alternative embodiment, shown in FIG. 9, the backstay 114 is coupled to the column 102 by a cam 140. The cam 140 is pivotally attached to the column 102 by an attachment bolt 810 and defines a plurality of apertures 812, each sized to receive a quick release pin. A first quick release pin 814 passes through one of the apertures of the cam 140 and through a corresponding aperture on the backstay 114 such that the cam 140 is also pivotally connected to the backstay 114. A second quick release pin 816 passes through another of the apertures 812 and a corresponding aperture in the column 102.

To adjust the radius of the davit, the cam 140 is pivoted about the attachment bolt 810 between at least two positions in which one of the plurality of apertures on the cam 140 is aligned with the aperture formed through the column. To fix the davit at a specific radius, the second quick release pin 816 is inserted through one of the apertures in the cam and through the aperture formed in the column, thereby fixing the cam 140 with respect to the column 102.

Figure 10:
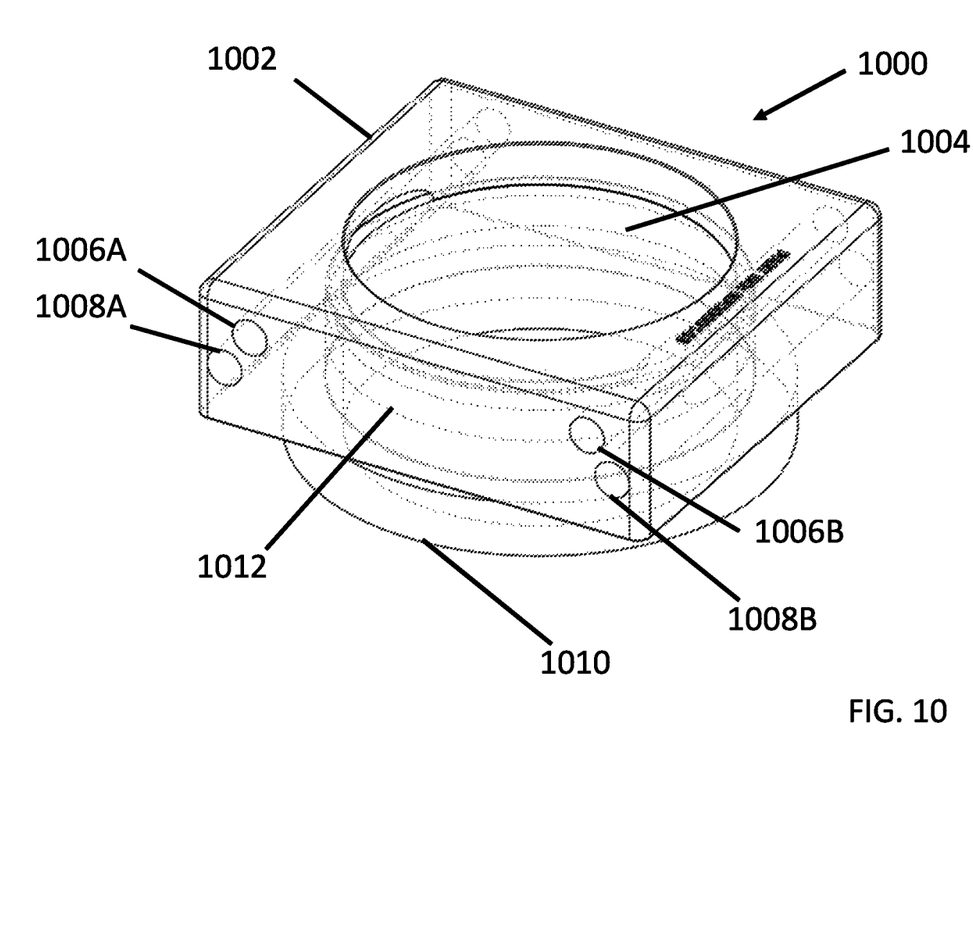
FIG. 10 shows a bearing according to embodiments of the invention.

FIG. 10 shows a bearing 1000 according to embodiments of the invention, used to couple the column 102 to the shaft, or king post, 104.

The bearing 1000 comprises a rigid body 1002 having an external profile shaped to fit within, and engage with, the column 102. In the illustrated embodiment, the column 102 is hollow and has a box section, and thus the external profile of the bearing body 1002 is square and shaped to fit within the box section. In alternative embodiments, the column 102 may have a different shape and thus the bearing body 1002 will also have a different shape. In further alternative embodiments, the bearing body 1002 may have a shape which differs from the internal dimensions of the column 102, but comprise some means for fixing the bearing 1000 with respect to the column 102.

The body has a wide, central bore 1004 which runs through the entire body, and in which the cylindrical shaft 104 sits during use. The body 1002 also defines a number of other narrower bores, arranged in pairs, which run in a direction perpendicular to the main bore 1004. A first pair of bores 1006A, 1006B is arranged as follows. One bore 1006A of the first pair is arranged such that it intersects with the main bore 1004 but is offset from a centre of the bore by a first distance. Geometrically, the bore 1006A can be described as a chord which is offset from the centre of the bore 1004. The other bore 1006B of the pair runs parallel to the first bore 1006A and intersects with the main bore 1004 at a point which is offset from the centre of the bore by the same first distance, but in an opposite direction. Thus the first pair of bores 1006A, 1006B are arranged on either side of and intersecting with the main bore 1004.

A second pair of bores 1008A, 1008B is arranged in a similar manner, but at a second, different distance from the centre of the bore 1004. Thus one bore 1008A of the second pair is arranged such that it intersects with the main bore 1004 but is offset from a centre of the bore by a second distance, which is different from the first distance. In the illustrated embodiment, the second distance is greater than the first distance. Geometrically, the bore 1008A can be described as a chord which is offset from the centre of the bore 1004 by the second distance. The other bore 1008B of the pair runs parallel to the first bore 1008A and intersects with the main bore 1004 at a point which is offset from the centre of the bore by the same second distance, but in an opposite direction. Thus the second pair of bores 1008A, 1008B are arranged on either side of and intersecting with the main bore 1004. In the illustrated embodiment, the second pair of bores are parallel to the first pair, but this is not necessary for the bearing 1000 to operate correctly.

Also shown in FIG. 10 is a sleeve 1010, which fits around the shaft 104. For that purpose, the sleeve 1010 has an internal profile with a diameter which is substantially the same as the diameter of the shaft 104. The sleeve 1010 has a groove running around its outer circumference.

In use, a pair of retaining pins (not illustrated) are inserted through either the first or second pair of bores 1006, 1008, such that they intersect the main bore 1004 and engage with a groove running around the circumference of a component received within the bore 1004. In one embodiment, this may be the groove of the sleeve 1010; in another embodiment, this may be a groove machined into the shaft 104 itself. The retaining pins thus couple the housing 1002 (and the column 102) to the sleeve 1010 (and/or the shaft 104) and allow rotation of the column relative to the shaft. The davit 100 may have a plurality of such bearings arranged at different points within the column 102, to securely couple the column 102 to the shaft 104.

In one embodiment, the wider-spaced pair of bores 1008 is arranged such that the distance between bores within the pair is the same as the diameter of the groove in the sleeve 1010. In some arrangements, however, there may be no sleeve 1010 and the groove may be machined directly in the shaft 104 itself. The diameter of the groove in the shaft is therefore smaller (due to the absence of the sleeve 1010) and thus the narrower-spaced pair of bores 1006 may be arranged such that the distance between bores within the pair is the same as the diameter of the groove in the shaft 104.

In one embodiment, the davit 100 comprises two bearings: one arranged towards the upper end of the column 102, and another arranged towards the lower end of the column 102. The upper bearing may engage directly with a groove machined into the shaft 104, and thus retaining pins for this bearing may be inserted into the first pair of bores 1006. The lower bearing may engage with the shaft 104 via a sleeve 1010, and thus retaining pins for this bearing may be inserted into the second, wider-spaced pair of bores 1008. In this way, the same bearing housing 1002 may be used to couple the column 102 either directly to the shaft 104, or indirectly via the sleeve 1010, by using a different pair of bores 1006, 1008.

In some embodiments, the apertures defining the central bore 1004 may have different diameters. For example, an upper aperture of the bore 1004 may have a diameter substantially equal to a diameter of the shaft 104. A lower aperture of the bore (i.e. the aperture on the opposite side of the body 1002 to the upper aperture) may have a wider diameter, which is substantially equal to a diameter of the sleeve 1010. In this way the bearing housing 1002 can be securely coupled to the shaft 104 (i.e. with no or minimal play) in the presence and absence of a sleeve 1010.

In a wider context, the same bearing housing 1002 may be used to couple a rotating element to multiple shafts of differing diameters, by selecting one of the plurality of pairs of bores 1006, 1008 to insert retaining pins through.

FIG. 11 shows the davit 100 when in a folded state. Note that any and all winching devices have been removed prior to folding. The backstay 114 is decoupled from the connection device 130 (or the cam 140) and folded. The pivoting connection between the backstay 114 and the lifting head 112 allows the backstay 114 to lie next to and aligned with the column 102. A pin 122 (which can optionally be the same pin as the pin 814 used to couple the backstay 114 to the connection device 130 or the cam 140) can be used to fix the folded backstay 114 to either or both of the ribs 105 in its stowed position. The jib 106 collapses as shown in FIG. 5 (or FIG. 6 if the davit 100 has been overloaded), and the retaining strap 107 can be tightened to secure the jib 106 to the side of the column 102. The retaining strap 107 may also comprise a carrying handle for ease of transportation.

The present invention thus provides a davit with a number of useful features. A jib of the davit can be made with an overload indicator, which provides a straightforward, visible mechanism to ascertain whether the davit is fit for use following an overload condition. This ensures the safe operation of the davit. The jib can be made collapsible with telescoping sections, at least one of the sections having a plurality of flats to allow easy connection with other components of the davit, such as the lifting head. A single type of bearing can be used to rotatably couple the davit to the shaft, or king post, with a plurality of different-spaced bores to account for different diameters of shaft. Either or both of these improvements allow the davit to be manufactured and erected easily by users.

Those skilled in the art will appreciate that various amendments and alterations can be made to the embodiments described above without departing from the scope of the invention as defined in the claims appended hereto.

Before going on to set out the claims however, we first provide the following list of clauses, which point out some features of some embodiments of the invention:

Clause 1. A davit, comprising:
 a column, mountable for rotation about a generally upright axis; and
 a jib attached to the column, wherein the jib comprises:
  an inner jib section and a hollow outer jib section, the inner section received in the outer jib section in a telescopic arrangement, such that the inner jib section is moveable between an extended position and a retracted position, and wherein an outer profile of the inner section comprises first and second substantially parallel sidewalls.

Clause 2. The davit according to clause 1 wherein the first and second sidewalls are connected to each other at each end by an arc, each arc having an outer profile that substantially corresponds in shape to a portion of an inner profile of the outer section.

Clause 3. The davit according to clause 2, wherein the inner profile of the outer jib section is generally circular.

Clause 4. The davit according to clause 1, wherein an outer profile of the outer jib section has a plurality of flat portions.

Clause 5. The davit according to clause 1, further comprising a head, the head comprising:

a first plate attached to the first sidewall by one or more fasteners and a second plate attached to the second sidewall by one or more fasteners, the head further comprising one or more tools for attaching a load.

Clause 6. The davit according to clause 5, wherein the first and second plates are attached to each other by one or more linking pins, and the one or more tools are mounted on one or more of the linking pins.

Clause 7. The davit according to clause 6, wherein the linking pins are moveable between at least first and second positions defined by slots in the first and second plates.

Clause 8. The davit according to clause 5, wherein the one or more tools comprise one or more of: sheaves and shackles.

Clause 9. The davit according to clause 1, wherein the jib is attached pivotally with respect to the column.

Clause 10. The davit according to clause 1, wherein a first end of the jib is attached to the column at a lower connection point of the column, and further comprising a backstay coupled between a second end of the jib and an upper connection point of the column.

Clause 11. The davit according to clause 10, wherein the backstay comprises one or more joints to allow folding thereof.

Clause 12. The davit according to clause 11, wherein the joints are arranged to allow folding of the backstay in a single direction only.

Clause 13. The davit according to clause 12, wherein the backstay comprises an upper limb pivotally connected to a lower limb, and wherein either part of the lower limb overlaps the upper limb or part of the upper limb overlaps the lower limb, such that the backstay is prevented from folding in one direction.

Clause 14. The davit according to clause 10, wherein the backstay is pivotally coupled to the upper connection point of the column via a mechanism for adjusting the radial length of the backstay from the column.

Clause 15. The davit according to clause 14, wherein the mechanism comprises one of:
- a plurality of upper connection points machined at different radial distances from the column; and
- a cam rotatably mounted on the column, wherein the cam comprises the upper connection point.

Clause 16. A davit, comprising:
- a column, mountable for rotation about a generally upright axis; and
- a jib attached to the column, wherein the jib comprises:
    an inner jib section and a hollow outer jib section, the inner section received in the outer jib section in a telescopic arrangement, such that the inner jib section is moveable between an extended position and a retracted position, wherein the inner jib section and the outer jib section have connection apertures for receiving a connection pin to allow the inner jib section to be fixed in at least the extended position, and wherein the inner jib section and the outer jib section are configured to deform differently if the davit becomes overloaded, such that the connection apertures no longer align.

Clause 17. The davit according to clause 16, wherein the outer jib section is configured to deform to a greater extent than the inner jib section if the davit becomes overloaded.

Clause 18. The davit according to clause 17, wherein the inner jib section is hollow and wherein walls of the outer jib section are thinner than walls of the inner jib section.

Clause 19. The davit according to clause 16, wherein the inner jib section and the outer jib section are configured to deform differently in that the connection apertures of the inner jib section are configured to deform differently to the connection apertures of the outer jib section.

Clause 20. The davit according to clause 16, wherein the connection apertures further allow the inner jib section to be fixed in the retracted position, and wherein the inner jib section and the outer jib section are configured to deform differently if the davit becomes overloaded, such that the connection apertures no longer align when the inner jib section is in the retracted position.

Clause 21. A bearing for allowing a column of a davit to be rotatably mounted on a substantially upright shaft, the bearing having a body shaped to correspond to an internal profile of the column, the body having a first bore for receiving a component on which the bearing bears and a first pair of parallel, spaced second bores, narrower than the first bore, which extend across the first bore in a direction perpendicular to an axis of the first bore and are configured to receive retaining pins which engage with a groove in the component received in the first bore.

Clause 22. The bearing according to clause 21, wherein the component is the shaft.

Clause 23. The bearing according to clause 21, wherein the component is a sleeve mounted on the shaft.

Clause 24. The bearing according to clause 21, further comprising a second pair of parallel, spaced second bores which extend across the first bore in a direction perpendicular to an axis of the first bore.

Clause 25. The bearing according to clause 24, wherein the first pair of second bores are spaced a first distance apart, and the second pair of second bores are spaced a second, different distance apart.

Clause 26. The bearing according to clause 21, wherein the outer component has an outer profile that corresponds to a box section.

The invention claimed is:

1. A bearing for allowing a column of a davit to be rotatably mounted on a substantially upright shaft, the bearing having a body shaped to correspond to an internal profile of the column, the body having a first bore for receiving a component on which the bearing bears and a first pair of parallel, spaced second bores, narrower than the first bore, which extend across the first bore in a direction perpendicular to an axis of the first bore and are configured to receive retaining pins which engage with a groove in the component received in the first bore.

2. The bearing according to claim 1, wherein the component is the shaft.

3. The bearing according to claim 1, wherein the component is a sleeve mounted on the shaft.

4. The bearing according to claim 1, further comprising a second pair of parallel, spaced second bores which extend across the first bore in a direction perpendicular to the axis of the first bore.

5. The bearing according to claim 4, wherein the first pair of second bores are spaced a first distance apart, and the second pair of second bores are spaced a second, different distance apart.

6. The bearing according to claim 5, wherein the body has an outer profile that corresponds to a box section.

* * * * *